(12) United States Patent
Borst et al.

(10) Patent No.: US 9,168,912 B2
(45) Date of Patent: Oct. 27, 2015

(54) OPERATING PROCESS FOR A FUEL CELL SYSTEM

(71) Applicant: Eberspächer Climate Control Systems GmbH & Co. KG, Esslingen (DE)

(72) Inventors: Andreas Borst, Esslingen (DE); Andreas Kaupert, Esslingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 0 days.

(21) Appl. No.: 14/302,813

(22) Filed: Jun. 12, 2014

(65) Prior Publication Data

US 2014/0371982 A1 Dec. 18, 2014

(30) Foreign Application Priority Data

Jun. 13, 2013 (DE) .......................... 10 2013 211 065

(51) Int. Cl.
*B60W 10/28* (2006.01)
*B60W 10/06* (2006.01)

(52) U.S. Cl.
CPC .............. *B60W 10/28* (2013.01); *B60W 10/06* (2013.01); *B60W 2510/06* (2013.01); *B60W 2510/28* (2013.01); *Y02E 60/50* (2013.01); *Y02T 90/34* (2013.01)

(58) Field of Classification Search
CPC ........... H01M 4/86; H01M 8/00; H01M 8/04; B60R 16/03; G07C 5/08; B60W 20/00; B60W 20/104; B60W 20/108; B60W 20/40
USPC ................ 701/1, 22, 36, 99; 180/65.1, 65.21, 180/65.24, 65.26, 65.28, 65.31
See application file for complete search history.

(56) References Cited

U.S. PATENT DOCUMENTS

| 5,828,967 | A * | 10/1998 | Ueda ................................. 701/1 |
| 7,273,120 | B2 * | 9/2007 | Tabata ..................... 180/65.265 |
| 7,438,984 | B2 * | 10/2008 | Aoyagi et al. ................. 429/430 |
| 8,261,863 | B2 * | 9/2012 | Kaupert .................... 180/65.275 |
| 2010/0155163 | A1 | 6/2010 | Kaupert |

FOREIGN PATENT DOCUMENTS

DE    10 2008 063088 A1    7/2010

* cited by examiner

*Primary Examiner* — Thomas Tarcza
*Assistant Examiner* — Tyler J Lee
(74) *Attorney, Agent, or Firm* — McGlew and Tuttle, P.C.

(57) ABSTRACT

A process for operating a fuel cell system (2), which is arranged in a vehicle (1) having a tachograph (6) and an internal combustion engine (3), and used for power supply of at least one electrical component (10) of the vehicle (1) with the internal combustion engine (3) switched off. With the fuel cell system (2) switched off, the control device (4) receives from the tachograph (6) a foreseeable break start time of an operating break following a drive mode, which is legally prescribed and/or planned by the driver of the vehicle (1), at which the internal combustion engine (3) is switched off. The control device (4) determines a start time such that a start procedure of the fuel cell system (2) ends at the break start time and the fuel cell system (2) is ready for operation, when the fuel cell system (2) is started at the start time.

20 Claims, 2 Drawing Sheets

OPERATING PROCESS FOR A FUEL CELL SYSTEM

CROSS REFERENCE TO RELATED APPLICATIONS

This application claims the benefit of priority under 35 U.S.C. §119 of German Patent Application DE 10 2013 211 065.0 filed Jun. 13, 2013, the entire contents of which are incorporated herein by reference.

FIELD OF THE INVENTION

The present invention pertains to a process for operating a fuel cell system.

BACKGROUND OF THE INVENTION

A fuel cell system can be used as an auxiliary power supply, i.e., as a so-called "APU," where APU stands for "Auxiliary Power Unit" in a motor vehicle which is equipped with an internal combustion engine. During a normal drive mode of the vehicle, i.e., with internal combustion engine switched on, the internal combustion engine usually drives a generator, a so-called "electric generator," via which all electrical components of the vehicle are supplied with power. During operating breaks, i.e., with the vehicle being stationary, it may be necessary to additionally supply certain electrical components of the vehicle with power. This can only be guaranteed to a limited extent by means of a battery of the vehicle. However, as soon as larger power consumers, e.g., an air conditioning unit, shall also remain switched on in such an operating break, a vehicle battery is not sufficient. Hence, it is further prevalent that during such an operating break, the internal combustion engine continues to remain switched on and, e.g., is operated in an idle operating state. In this idle operating state, the internal combustion engine continues to work, however, outside its optimal efficiency, such that this power production is comparatively expensive.

To be able to save fuel during such operating breaks, fuel cell systems such as APUs are used. Such a fuel cell system usually comprises at least one fuel cell in which an electrolyte separates a cathode side from an anode side. Usually, here, a plurality of single fuel cell elements are stacked one on top of another to form a fuel cell stack. A hydrogen-containing anode gas is fed to the anode side, while an oxygen-containing cathode gas is fed to the cathode side. The cathode gas is usually air. The anode gas can be generated by means of a reformer, in particular by means of catalytic conversion, from a hydrogen-containing fuel, and the product of the reformer is usually designated as reformate gas. The reformer advantageously uses the same fuel as the internal combustion engine. A fuel cell, which can process hot reformate gas, which is produced by a reformer, is usually a solid fuel cell or high-temperature fuel cell, which is, as a rule, also designated as "SOFC," where SOFC stands for "Solid Oxide Fluid Cell." Such a fuel cell system, especially in the form of an SOFC is, as a rule, optimized for at least one predetermined nominal operating state, in which each of the individual components of the fuel cell system has a predetermined operating temperature. In order to protect the individual components against an excessive thermal and mechanical stress when starting such a fuel cell system, and to keep the energy consumption as low as possible when starting the fuel cell system, it is necessary to carry out a predetermined start procedure or a predetermined start routine, which takes up comparatively much time. The starting of the APU at the beginning of an operating break is therefore accompanied by a certain loss of comfort.

A process for operating a fuel cell system, in which a control device of the fuel cell system is coupled with a navigation device of the vehicle, in such a way that the control device recognizes a foreseeable arrival time from the navigation device, is known from DE 10 2008 063 088 A1. The prior-art operating process assumes that the fuel cell system is switched on during the drive mode of the vehicle and should be switched off when reaching the travel goal. In the prior-art process, the control device calculates a time for activating a switch-off procedure or switch-off routine for the fuel cell system to be able to switch this off as gently as possible for the individual components.

Such a switch-off procedure also requires comparatively much time. The control device can now select the time for activating the switch-off procedure in a specific manner, such that the switch-off procedure is essentially completely finished at the travel end time determined by the navigation device, such that the end of the switch-off procedure essentially coincides with the travel end.

SUMMARY OF THE INVENTION

An object of the present invention is to propose an improved embodiment for an operating process of the type mentioned in the introduction, which offers increased comfort when using a fuel cell system in a vehicle.

This object is accomplished by the process according to the present invention.

The present invention is based on the general idea of using a tachograph, which is present in a vehicle, in which the fuel cell system should be used for power supply in an operating break, in order to provide a foreseeable break start time, which is recorded in the tachograph, of an operating break following the current drive mode to the control device of the fuel cell system such that the control device can calculate a system start time for the fuel cell system depending on this break start time in such a way that the fuel cell system is ready for operation at the break start time, in order to guarantee the power supply and to be able to switch off the internal combustion engine. In other words, the control device calculates the system start time, so that a start procedure of the fuel cell system is ended at the break start time predetermined by the tachograph, provided that the fuel cell system is also started at the determined system start time.

According to the present invention, the fuel cell system is available for power supply at the beginning of a break such that there is no loss of comfort when switching off the internal combustion engine. The internal combustion engine can also be switched off at the beginning of a break in order to save fuel.

Such a tachograph can also be designated as "tachograph." Tachographs are above all prescribed for utility vehicles. Purely as examples and without limiting generalities, European regulations EWG No. 3821/85, EG No. 2135/98, EG No. 1360/2002, EG No. 561/2006 and EU No. 1266/2009 may be mentioned in this regard. Further, there are similar regulations, e.g., in the USA of the "Federal Motor Carrier Safety Administration" (FMCSA), e.g., §395.15 "Automatic on-board recording devices (AOBRD) and §395.16 "Electronic on-board recorders" (EOBRS).

In order to be able to comply with legal regulations, the respective tachograph predetermines the beginning of the next operating break to be observed by the driver depending on the beginning of the respective drive mode. In addition, the driver can preset to the tachograph a random operating break deviating from the legally prescribed operating break, which may be temporally before the legally prescribed operating break. For example, the driver can activate a preferred break place or resting place. The foreseeable time of arrival at this resting place or break place then defines the randomly selected break start time. The driver can freely predetermine this break start time or else let it be determined by a navigation device. A coupling between the tachograph and the navigation device is especially comfortable here such that the driver can receive the foreseeable arrival time, which is calculated by the navigation device, at the desired resting place, in the tachograph, in order to replace a legally prescribed operating break therewith this randomly selected operating break determined by the navigation device—provided this is permissible.

Basically, provisions may be made for the control device at the determined system start time to then activate the fuel cell system for starting the start procedure. According to a preferred embodiment, however, provisions may be made for the control device to poll a start confirmation by the driver before or at the determined system start time and to activate the fuel cell system at the system start time for starting the start procedure only when the start confirmation has been received. It can be guaranteed by such a start confirmation that the fuel cell system is actually started only if it is also needed in the operating break.

According to another embodiment, during the drive mode with the fuel cell system switched off, the control device can receive a foreseeable break length of the operating break following the drive mode from the tachograph. The control device can now, depending on the foreseeable break length, select a system operating mode of the fuel cell system suitable for this. This embodiment is based on the discovery that the above-mentioned legal regulations prescribe not only the beginning of an operating break, but also the length of such an operating break such that this additional information can be used by the control device for optimizing the operation of the fuel cell system. For example, the possible operating breaks can be classified into three categories, namely short operating breaks, medium operating breaks and long operating breaks. Depending on the respective break length, an optimized system operating mode can then be selected and set for the fuel cell system, such that at the break start time, the fuel cell system is ready for operation in the optimized system operating mode. The different operating modes of the fuel cell system can be distinguished from each other, e.g., by different system pressures and/or system temperatures, in order to achieve an energy-related optimized operation for the fuel cell system within the foreseeable break length.

Corresponding to an especially advantageous variant, the control device can determine the system start time depending on the start procedure corresponding to the selected system operating mode. This variant is based on the consideration that different system operating modes may also have different optimized start procedures. By means of taking the selected system operating mode into account, the control device can select the optimal start procedure in each case.

It is clear that here as well, the driver is able to randomly select the respective break length and to communicate the desired break length to the tachograph.

Corresponding to an advantageous embodiment, the control device can communicate in a wireless manner with the tachograph. Interfaces operating in a wireless manner are, e.g., wireless local area network (WLAN), Bluetooth, general packet radio service (GPRS), universal mobile telecommunications system (UMTS), long term evolution (LTE), Near Field Communication (NFC) and wireless connections. If such a wireless communication is provided, the operating process suggested here can be taken into account later as well, e.g., within the framework of an update. The wireless communication can also be achieved in an especially simple manner with a later installation of a fuel cell system in the vehicle, since an elaborate laying of cables can be omitted.

As an alternative to this, according to another embodiment, provisions may be made for the control device to communicate with the tachograph in a wired manner. Cabled interfaces are, e.g., universal serial bus (USB) interfaces and serial interfaces. Wired interfaces are less prone to interference.

In another advantageous embodiment, the control device may communicate with an information system of the vehicle, which has a display for displaying information in the driver area, especially on a dashboard of the vehicle. For example, the control device may display information of the fuel cell system via the display of the information system. In such an embodiment, the fuel cell system does not need its own display in the driver area, which reduces the cost for producing the fuel cell system.

An embodiment, in which the above-mentioned polling of the start confirmation of the control device is performed via the above-mentioned display of the information system, is especially advantageous. Thus, for this, the driver can be prompted via the display to confirm the starting of the fuel cell system with the start procedure, so that the fuel cell system is ready for operation at the break start time. The display can usually be configured here as a touch screen. Corresponding entry keys can also be assigned to the display.

In another advantageous embodiment, the control device may communicate with a proprietary remote control of the fuel cell system or with a smart phone or with a tablet computer and then display the information of the fuel cell system via a display of the remote control or smart phone or tablet computer. The usual, current wireless interfaces, which have already been mentioned above, can be used in this case as well.

Corresponding to an especially advantageous variant, the polling of the start confirmation of the control device can now be performed via the display of the remote control or smart phone or tablet computer, as a result of which the operation of the fuel cell system is especially comfortable.

According to an advantageous variant, the driver may communicate with the respective external device, i.e., especially with the remote control of the fuel cell system or with the smart phone or with the tablet computer, in a voice-controlled manner, i.e., by means of voice control. As a result of this, this communication or interaction between man and machine is simplified. As a result of this, the driver is less distracted, which makes driving safer.

According to one embodiment, provisions may generally be made for the driver to communicate with the control device and/or with the tachograph in a voice-controlled manner, i.e., to communicate by means of a voice control. This also simplifies the man-machine interaction and leads to an improved driving safety.

Via the foreseeable break length, the control device also recognizes a foreseeable break end time such that it is possible, corresponding to an advantageous variant, for the control device to be configured such that it also activates a switch-off procedure of the fuel cell system towards the end of the operating break in order to be able to switch off the fuel cell system in an especially gentle manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
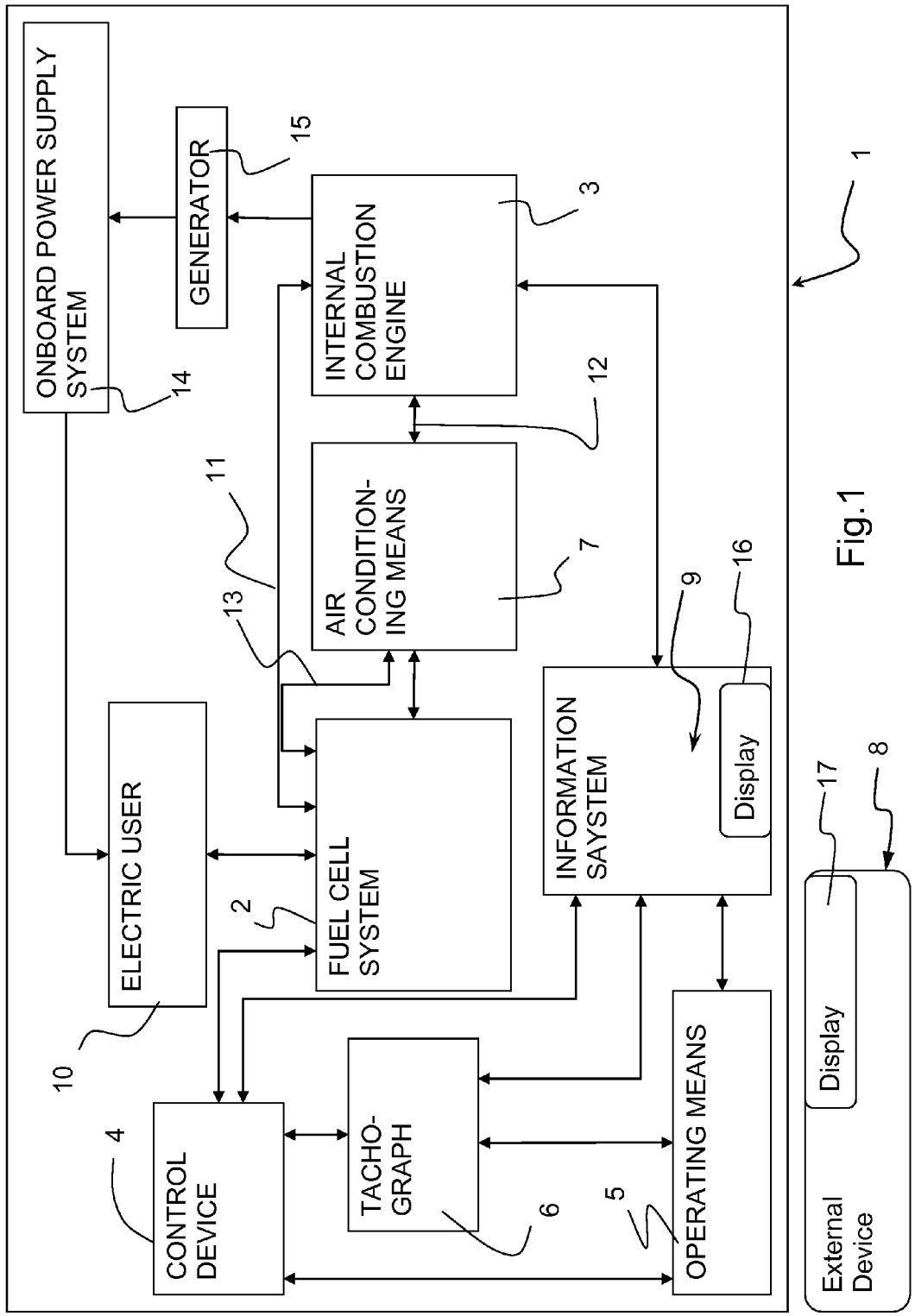
FIG. 1 is a highly simplified, circuit-diagram-like general view of a motor vehicle with a fuel cell system.
Figure 2:
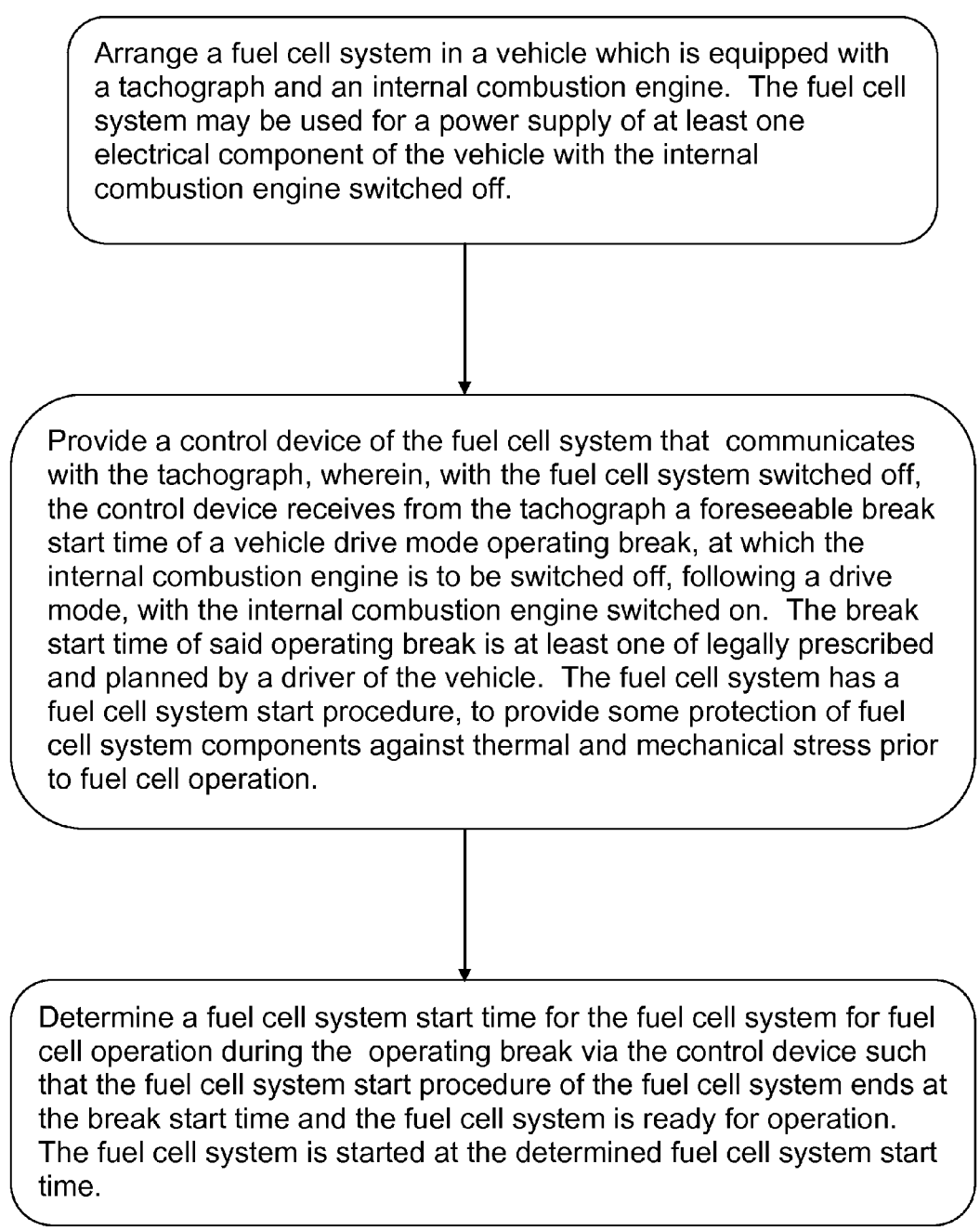
FIG. 2 is a diagram showing process features according to the invention.

Referring to the drawings in particular, FIG. 1, a motor vehicle 1, shown in a simplified manner, comprises a fuel cell system 2. The fuel cell system 2 is used in the vehicle 1 as a supplier of electric energy. The fuel cell system 2 can supply electric power independently from an internal combustion engine 3 of the vehicle 1, i.e., especially also with the internal combustion engine 3 switched off. With the internal combustion engine 3 switched off, the fuel cell system 2 is used for supplying at least one electric consumer 10 or an electrical component 10 of the vehicle 1 with electric energy. With the fuel cell system 2 switched off and the internal combustion engine 3 switched on, the respective consumer 10 can be supplied with electric energy directly by the internal combustion engine 3 or an onboard power supply system 14 of the vehicle 1. Here, the internal combustion engine 3 usually drives a generator 15, which is, as a rule, designated as an "electric generator."

A control device 4, which is coupled with the fuel cell system 2 in a suitable manner, is provided for operating the fuel cell system 2. E.g., a manually actuatable operating means 5 can be provided for switching on and switching off the fuel cell system 2. This operating means can be contained in the vehicle 1 specifically for operating the fuel cell system 2. As an alternative, the operating means 5 may also be an operating means of the vehicle 1, which is adapted to receive corresponding data and commands for the control device 4 of the fuel cell system 2. A voice control may be provided for communication or interaction between the driver and the control device 4 as well.

Moreover, the vehicle 1 is equipped with a tachograph 6, which takes legal regulations into account in order to determine prescribed breaks with regard to break beginning and break length at the time of starting the vehicle 1. However, the driver or motorist can, moreover, communicate a wish for an operating break to the tachograph 6 via the operating means 5 or via a different operating means. The tachograph 6 can accept this wish, when the wish corresponds to the legal regulations. It is also basically possible for the driver to be able to override legal regulations with his wish.

In any case, the driver is able to communicate the desired operating breaks to the tachograph 6 at the beginning of a drive mode or during the drive mode. A voice control may also be provided here for communication or interaction between the driver and the tachograph 6. The control device 4 communicates with the tachograph 6 in such a way that it receives a foreseeable break start time and especially also a foreseeable break length at least for the currently next operating break from the tachograph 6.

In the example of FIG. 1 corresponding to a double arrow 11, the fuel cell system 2 is coupled in a heat-transmitting manner with the internal combustion engine 3. The internal combustion engine 3 may, in addition, be coupled, e.g., with an air conditioning means 7 corresponding to a double arrow 12. In addition or as an alternative, a heat-transmitting coupling may also be provided between the fuel cell system 2 and the air conditioning means 7 according to a double arrow 13.

The control device 4 may now be embodied or programmed for performing an operating process described below.

At first, the control device communicates with the tachograph 6. During a drive mode of the vehicle 1, i.e., with the internal combustion engine 3 switched on, the control device 4 can receive from the tachograph 6, with the fuel cell system 2 switched off, a foreseeable break start time, which belongs to an operating break directly following the current drive mode that is legally prescribed or planned by the driver of the vehicle 1. During this operating break, the internal combustion engine 3 should be switched off, while the respective consumer 10 of the vehicle 1 should then be supplied with electric energy by means of the fuel cell system 2. The control device 4 can now calculate a system start time for the fuel cell system 2 for this operating break and in such a way that a start procedure for starting the fuel cell system 2 is ended when the break start time is reached, so that the fuel cell system 2 is ready for operation at this break start time, provided the fuel cell system 2 is actually started at the determined system start time. The latter can basically be automatically initiated by the control device 4, i.e., without further interaction with the motorist. However, an embodiment, in which the control device 4 prompts a start confirmation from the driver before or at the determined system start time and activates the fuel cell system 2 at the system start time actually for starting the start procedure only when the start confirmation has been received, is preferred. Also conceivable is a variant, in which the control device 4 gives the driver the possibility, before or at the determined system start time, of stopping the automatic start of the start procedure by means of a corresponding command. In this case, the driver must not be active for actuating the start procedure. Here as well, the man-machine interaction, i.e., communication or interaction between the driver and the control device 4 can take place in a voice-controlled manner.

If, moreover, the control device 4 receives, during the drive mode with fuel cell system 2 switched off, from the tachograph 6 a foreseeable break length of the operating break following the drive mode, the control device 4 can select a system operating mode of the fuel cell system 2 suitable for this, depending on the foreseeable break length. For example, three operating breaks of different length can be provided, to which three different system operating modes are assigned. For example, a short operating break may last 30 minutes at most. A medium operating break may have, e.g., a break length of 30 minutes to two hours. A long operating break may, on the other hand, have a break length of more than two hours. The control device 4 may now prepare optimized system operating modes for the fuel cell system 2 for the different break lengths in order to keep the fuel cell system 2 in the respective system operating mode ready for operation at the break start time. Provisions may especially be provided here for different start procedures to also be assigned to the individual system operating modes. These start procedures can especially also be distinguished from each other in terms of the time needed for them. The control device 4 can now determine the system start time depending on the start procedure associated with the selected system operating mode.

In the example shown in FIG. 1, the control device 4 communicates in a wired manner with the tachograph 6. In another embodiment, it is, on the other hand, basically possible to couple the control device 4 with the tachograph 6 via a wireless interface. In this way, the control device 4 may also be embodied as a separate device. It is also conceivable for the control device 4 to form with the remaining fuel cell system 2 a structural unit, which can be especially later mounted on or in the vehicle 1.

The vehicle 1 can further be equipped with an information system 9 in which it may be a navigation device or a multimedia device or the like. The information system 9 in this case is advantageously equipped with a display, which is used for displaying information, in a driver area, especially on a dashboard of the vehicle 1. The control device 4 can now display information of the fuel cell system 2 via a corresponding coupling via the display 16 of the information system 9. Provisions may also especially be made for the above-mentioned polling of the control device 4, by means of which the driver is prompted to give a start confirmation, to take place via the display 16 of the information system 9. The information system 9 can optionally again be operated by the driver by means of voice control.

Moreover, the control device 4 can communicate with an external device 8, preferably in a wireless manner. This device 8 may be, e.g., a proprietary remote control of the fuel cell system 2 or a smart phone or tablet computer. The control device 4 can now display information of the fuel cell system 2 via a display 17 of this device 8. It is also especially possible here to achieve the above-mentioned polling of the start confirmation, directed at the driver, via the display 17 of the remote control or smart phone or tablet computer, i.e., of the device 8. A voice control may also be provided here as a man-machine interface.

If the control device 4 recognizes the break length, it may also determine a foreseeable break end time from the break start time and the break length. The control device 4 can prepare a switch-off procedure for the fuel cell system 2 depending on the break end time in such a way that the switch-off procedure can be activated with the ending of the operating break.

While specific embodiments of the invention have been shown and described in detail to illustrate the application of the principles of the invention, it will be understood that the invention may be embodied otherwise without departing from such principles.

What is claimed is:

1. A process for operating a fuel cell system, which is arranged in a vehicle which is equipped with a tachograph and an internal combustion engine and which is used for a power supply of at least one electrical component of the vehicle with the internal combustion engine switched off, the process comprising:
providing a control device of the fuel cell system, said control device communicating with the tachograph, wherein, with the fuel cell system switched off, said control device receives from the tachograph a foreseeable break start time of an operating break, at which the internal combustion engine is to be switched off, following a drive mode, with the internal combustion engine switched on, said break start time of said operating break being at least one of legally prescribed and planned by a driver of the vehicle, the fuel cell system having a fuel cell system start procedure, to provide some protection of fuel cell system components against thermal and mechanical stress prior to fuel cell operation; and
determining a fuel cell system start time for the fuel cell system for fuel cell operation during said operating break via said control device such that said fuel cell system start procedure of the fuel cell system ends at said break start time and the fuel cell system is ready for operation, when the fuel cell system is started at the determined fuel cell system start time.

2. A process in accordance with claim 1, wherein the control device polls a start confirmation by the driver before or at the determined system start time and only activates the fuel cell system at the system start time for starting the start procedure once the start confirmation has been received.

3. A process in accordance with claim 1, wherein:
during the drive mode with the fuel cell system switched off, the control device receives from the tachograph a foreseeable break length of the operating break following the drive mode;
depending on the foreseeable break length, the control device selects a system operating mode of the fuel cell system that is suitable for the foreseeable break length.

4. A process in accordance with claim 3, wherein the control device determines the system start time depending on the start procedure corresponding to the selected system operating mode.

5. A process in accordance with claim 1, wherein the control device communicates with the tachograph in a wireless manner.

6. A process in accordance with claim 1, wherein the control device communicates with the tachograph in a wired manner.

7. A process in accordance with claim 2, wherein:
the control device communicates with an information system of the vehicle, said information system having a display for displaying information in a driver area;
the control device displays information of the fuel cell system via the display of the information system.

8. A process in accordance with claim 7, wherein the polling of the start confirmation of the control device is performed via the display of the information system.

9. A process in accordance with claim 2, wherein the control device communicates with an external device and information of the fuel cell system is displayed via a display of the external device.

10. A process in accordance with the claim 9, wherein the polling of the start confirmation of the control device is performed via the display of the external device.

11. A process in accordance with claim 9, wherein a voice control is provided for communication between the driver and the external device.

12. A process in accordance with claim 1, wherein a voice control is provided for communication between the driver and one or more of the control device and the tachograph.

13. A process in accordance with claim 7, wherein said display displays information on a dashboard of the vehicle.

14. A process in accordance with claim 9, wherein said external device comprises one of a proprietary remote control of the fuel cell system, a smart phone and a tablet computer, wherein said information of the fuel cell system is displayed via said display of said one of said proprietary remote control of the fuel cell system, said smart phone and said tablet computer.

15. A process comprising:
providing a vehicle comprising at least one electrical component, a tachograph and an internal combustion engine;
providing an operating a fuel cell system comprising a control device, said control device being connected to said tachograph, said fuel cell system being arranged in said vehicle, said fuel cell system for providing power to said at least one electrical component during operating breaks, with said internal combustion engine switched off, the fuel cell system having a fuel cell system start procedure, to provide some protection of fuel cell system components against thermal and mechanical stress prior to fuel cell operation;

providing a foreseeable operating break start time of an operating break as output via said tachograph, said foreseeable operating break start time corresponding to a point in time at which the internal combustion engine is switched off, said control device receiving said foreseeable operating break start time as input; and determining a system start time for the fuel cell system for said operating break via said control device such that the start procedure of the fuel cell system ends at the foreseeable break start time and the fuel cell system is ready for operation when the fuel cell system is started at the determined system start time.

16. A process in accordance with claim 15, wherein said foreseeable operating break follows a drive mode, and said foreseeable operating break is at least one of legally prescribed, based on said drive mode, and planned by a driver of the vehicle.

17. A process in accordance with claim 15, wherein the control device polls a start confirmation by the driver before or at the determined system start time and only activates the fuel cell system at the system start time for starting the start procedure once the start confirmation has been received.

18. A process comprising:
providing a vehicle comprising at least one electrical component, a tachograph and an internal combustion engine, said tachograph determining a foreseeable break start time of an operating break, said foreseeable break start time corresponding to a point in time at which the internal combustion engine is switched off following a drive mode during which the internal combustion engine is switched on;

providing an operating a fuel cell system comprising a control device, said control device being connected to said tachograph, said fuel cell system being arranged in said vehicle, said fuel cell system for providing power to said at least one electrical component during operating breaks, when said internal combustion engine is in an off state, the fuel cell system having a fuel cell system start procedure, to provide some protection of fuel cell system components against thermal and mechanical stress prior to fuel cell operation;

providing said foreseeable break start time to said control device as input with said fuel cell system in an inactive state;

determining a system start time for the fuel cell system for said foreseeable operating break via said control device; and ending the fuel cell start procedure of the fuel cell system at the foreseeable break start time and providing the fuel cell system in an operational state at the determined system start time.

19. A process in accordance with claim 18, wherein said operating break follows a drive mode, which is legally prescribed and/or planned by a driver of the vehicle, said control device determining said system start time based on said foreseeable break start time.

20. A process in accordance with claim 18, wherein the control device polls a start confirmation by the driver before or at the determined system start time and only activates the fuel cell system at the system start time for starting the start procedure once the start confirmation has been received.

* * * * *